Dec. 14, 1937.  I. A. SHANTON  2,102,563
TRAP FOR ANIMALS
Filed Dec. 18, 1936
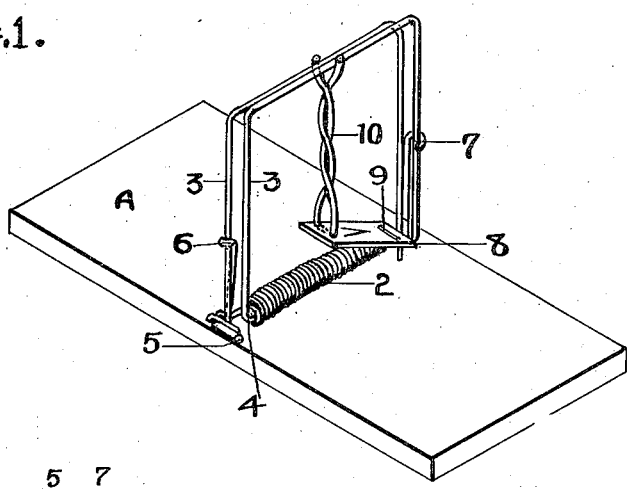
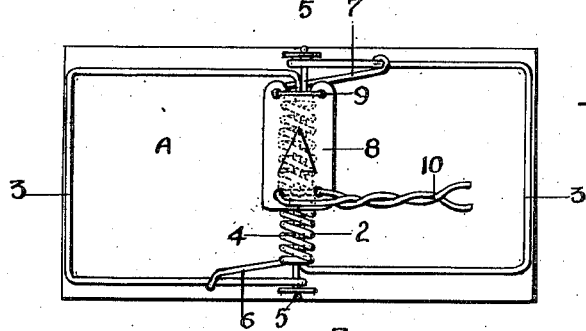
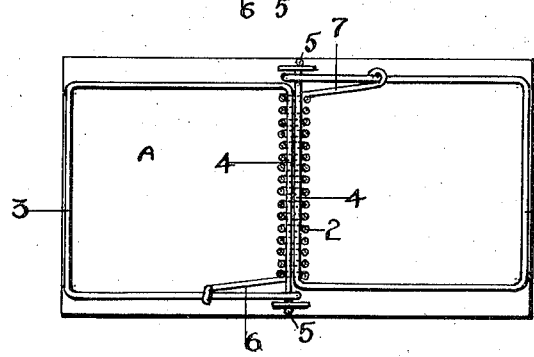
Inventor
IRA A. SHANTON
By Edward M. Fisher
Attorney Patented Dec. 14, 1937

2,102,563

UNITED STATES PATENT OFFICE 2,102,563

TRAP FOR ANIMALS

Ira A. Shanton, St. Petersburg, Fla.

Application December 18, 1936, Serial No. 116,455

1 Claim. (Cl. 43—82)

My invention relates to improvements in spring traps for animals, more particularly mice and rats, and the principal object of my invention is to provide a trap which can not be tripped; after being set, without the animal coming in contact with the bait in the bait holder which will result in the animal's being caught. I know that traps of this nature have been invented, but from experience it has been found that they are not positive in their trapping ability as it is possible for the animal to trip them and not be caught, all of which it appears has been overcome by my invention.

Other objects and advantages will present themselves during consideration of this invention.

I attain these objects by means illustrated in the accompanying drawing, in which:—

Fig. 1 is a perspective view of my trap when same is set.

Fig. 2 is a plan view of my trap before being set.

Fig. 3, while similar to Fig. 2, is a horizontal sectional view on the center line of the spring member.

Similar reference characters refer to similar parts throughout the several views.

Now referring more particularly to the drawing my invention consists of a base "A" upon which the trapping means is suitably mounted with staples or other means, said trapping means consisting of a spring 2, and trapping members 3 which are of suitable wire material, substantially square shaped, the lower portion 4 of said trapping members forming a shaft upon which the spring 2 is mounted, the ends of said portion 4 being bent at a right angle at 5 to provide a supporting member for said trapping members 3. Actuating means from said spring to said trapping members is provided through portions 6 and 7 which are continuing portions of spring 2 at its opposite ends and which are bent upward and at a right angle to said spring and secured at its extreme ends to said trapping members 3.

To provide a suitable bait holder and a sensitive means for springing the trap I provide a bait holder 8 which is hinged at 9 and has, at its opposite end, a trigger member 10, which preferably is of spring steel wire, attached to said bait holder and forked at its opposite end to permit a sensitive engagement with the trapping members 3 when the trap is set as shown in Fig. 1.

As will be seen on reference to the drawing the spring member 2, trapping members 3, bait holder 8 and trigger member 10 are all centrally located on said base "A" and trapping members 3 are so arranged that when the trap is sprung they will be thrown by the spring actuating means in opposite directions.

What I claim:—

A spring trap for animals, having in combination, wire trapping members, substantially square shaped, the lower portions forming a supporting means for a spring actuating member for said trapping members and arranged to throw said trapping members in opposite directions, a suitably hinged bait holder centrally located and having attached at its inner end a trigger member which is forked at its outer end to permit sensitive engagement with the trapping members when trap is set, and a base member upon which said trapping means are mounted.

IRA A. SHANTON.